(12) United States Patent
Milan et al.

(10) Patent No.: US 9,721,324 B2
(45) Date of Patent: Aug. 1, 2017

(54) THUMBNAIL ZOOM

(75) Inventors: Joseph Milan, Mercer Island, WA (US); Wei Huang, Bellevue, WA (US); John Hancock, Bellevue, WA (US); Patrick Baumgartner, Kirkland, WA (US); Drew Voegele, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1078 days.

(21) Appl. No.: 13/229,719

(22) Filed: Sep. 10, 2011

(65) Prior Publication Data
US 2013/0063495 A1   Mar. 14, 2013

(51) Int. Cl.
*G06T 3/00* (2006.01)

(52) U.S. Cl.
CPC .................. *G06T 3/0012* (2013.01)

(58) Field of Classification Search
CPC ................................ G06T 3/0012
USPC ...................................... 345/666
See application file for complete search history.

(56) References Cited

U.S. PATENT DOCUMENTS

| | | | |
|---|---|---|---|
| 7,536,654 B2 | 5/2009 | Anthony et al. | |
| 7,739,622 B2 | 6/2010 | DeLine et al. | |
| 2005/0083426 A1 | 4/2005 | Yoo et al. | |
| 2005/0171940 A1* | 8/2005 | Fogg et al. | 707/3 |
| 2006/0004914 A1* | 1/2006 | Kelly et al. | 709/219 |
| 2006/0155757 A1* | 7/2006 | Williams | G06F 17/30061 |
| 2006/0156245 A1* | 7/2006 | Williams | G06F 3/0485 |
| | | | 715/764 |
| 2006/0247855 A1* | 11/2006 | de Silva | G01C 21/36 |
| | | | 701/454 |
| 2007/0011316 A1 | 1/2007 | Araki et al. | |
| 2007/0260999 A1* | 11/2007 | Amadio | G06F 3/0481 |
| | | | 715/804 |
| 2008/0104535 A1* | 5/2008 | DeLine et al. | 715/785 |
| 2008/0235585 A1* | 9/2008 | Hart | G06F 17/30058 |
| | | | 715/717 |
| 2008/0307343 A1 | 12/2008 | Robert et al. | |
| 2008/0307363 A1* | 12/2008 | Jalon et al. | 715/835 |
| 2009/0037844 A1* | 2/2009 | Kim et al. | 715/815 |
| 2009/0307306 A1* | 12/2009 | Jalon et al. | 709/203 |
| 2010/0225773 A1* | 9/2010 | Lee | H04N 5/232 |
| | | | 348/222.1 |

(Continued)

FOREIGN PATENT DOCUMENTS

| | | |
|---|---|---|
| CN | 1804838 A | 7/2006 |
| CN | 101179732 A | 5/2008 |

OTHER PUBLICATIONS

Berna Erol, Kathrin Berkner, Siddharth Joshi, Multimedia Thumbnails for Documents, 2006, Proceedings of the 14th ACM international conference on Multimedia MM '06, pp. 231-240.*

Li-Qun Chen, Xing Xie, Xin Fan, Wei-Ying Ma, Hong-Jiang Zhang, He-Qin Zhou, A visual attention model for adapting images on small displays, 2003, Multimedia Systems, pp. 1-12, DOI 10.1007/s00530-003-0105-4.*

(Continued)

*Primary Examiner* — Michael J Cobb
(74) *Attorney, Agent, or Firm* — David W. Grillo

(57) ABSTRACT

File exploration is facilitated by enabling zoom with respect to a thumbnail as a function of an identified point of interest. More particularly, a scaled thumbnail of the same size as a thumbnail can be presented as a function of an identified point of interest. Furthermore, navigation, among other things, is enabled to allow panning with respect to a scaled thumbnail, for instance.

19 Claims, 9 Drawing Sheets

(56) References Cited

U.S. PATENT DOCUMENTS

| | | | |
|---|---|---|---|
| 2010/0231609 A1* | 9/2010 | Chatting | G06T 3/0012 345/660 |
| 2010/0259597 A1* | 10/2010 | Choi | G06K 9/00255 348/46 |
| 2010/0306696 A1 | 12/2010 | Groth et al. | |
| 2011/0007187 A1* | 1/2011 | Mori | G06T 7/0042 348/239 |
| 2011/0109581 A1* | 5/2011 | Ozawa | G06F 3/0481 345/173 |
| 2011/0116769 A1 | 5/2011 | Sugiyama et al. | |
| 2011/0320983 A1* | 12/2011 | Chen et al. | 715/836 |
| 2012/0042282 A1* | 2/2012 | Wong | 715/811 |
| 2013/0016128 A1* | 1/2013 | Bhatt | 345/661 |
| 2013/0088519 A1* | 4/2013 | Cristescu | G06T 3/40 345/667 |
| 2013/0104076 A1* | 4/2013 | Cristescu | G06F 3/0485 715/800 |
| 2013/0342640 A1* | 12/2013 | Li | H04N 7/15 348/14.13 |

OTHER PUBLICATIONS

Pierre-Yves Laffont, Jong Yun Jun, Christian Wolf, Yu-Wing Tai, Khalid Idrissi, George Drettakis, Sung-eui Yoon, Interactive Content-Aware Zooming, 2010, Proceedings of Graphics Interface GI '10, pp. 79-87.*

Edward W. Ishak, Steven K. Feiner, Content-Aware Scrolling, 2006, Proceedings of the 19th annual ACM symposium on User software and technology UIST '06, pp. 155-158.*

Hover Zoom Effect with jQuery and CSS, Retrieved at <<http://mattbango.com/notebook/web-development/hover-zoom-effect-with-jquery-and-css/>>, Retrieved Date: Jun. 10, 2011, pp. 7.

"QuadView® HDx", Retrieved at <<http://www.rgb.com/products/QuadViewHD/?c=n>>, Retrieved Date: Jun. 10, 2011, pp. 2.

"Visere 4 & 3", Retrieved at <<http://dmmd.net/main_wp/visere-4-3/>>, Retrieved Date: Jun. 10, 2011, p. 1.

"First Office Action and Search Report Received for Chinese Patent Application No. 201210331147.X", Mailed Date: Nov. 3, 2014, 14 Pages.

"Second Office Action Issued in Chinese Patent Application No. 201210331147.X", Mailed Date: Jul. 16, 2015, 12 Pages.

* cited by examiner

THUMBNAIL ZOOM

BACKGROUND

A variety of techniques has been developed to aid users in exploring vast quantities of digital content (e.g., data, information). For example, file systems organize collections of content in files with descriptive names and directories (a.k.a., folders) that allow grouping of related content. Further, metadata, descriptive of content, can be maintained to facilitate location of particular files. For example, content author, date of creation, location, and/or keywords can be associated with a file to make such content searchable. Further yet, thumbnails, or small visual depictions of content, can be employed to enable information to be gleaned about file content by way of quick visual inspection and without opening the file.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to thumbnail zoom. A dynamic thumbnail is provided, which allows, among other things, zooming with respect to file content represented by the thumbnail. Consequently, specific information can be acquired about a file to aid understanding of content and differentiation of similar files without expending time and resources associated with opening a file. In accordance with one aspect, a thumbnail interface enables zooming and navigation of file content within the thumbnail rather than an enlarged view, and zooming is performed as a function of an identified point of interest.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

A thumbnail is a small visual representation of a file (e.g., collection of data, program . . . ) that is presented to a user in a file browsing interface or the like. Multiple thumbnails are typically displayed on a screen to allow users to preview content of multiple files with a quick visual inspection, and without opening the files. While generally beneficial, the diminutive nature of thumbnails can be problematic for particular files such as those including complex or substantially similar content. In these situations, it is conventionally necessary to open such files to understand and differentiate file content.

Details below are generally directed toward thumbnail zoom. File exploration is facilitated by replacing a thumbnail with a scaled thumbnail of the same size thereby allowing a user to better understand the contents of a file without opening the file. The scaled thumbnail can be produced as a function of a specified point of interest with respect to the thumbnail. By way of example, upon positioning a pointer over a thumbnail, a zoomed-in version of the thumbnail can be presented based on the position of the pointer. Stated differently, a dynamic thumbnail is provided with a navigable and scalable interface. Among other things, file content interaction can also be enabled that allows changes to content to be made by way of a scaled thumbnail.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
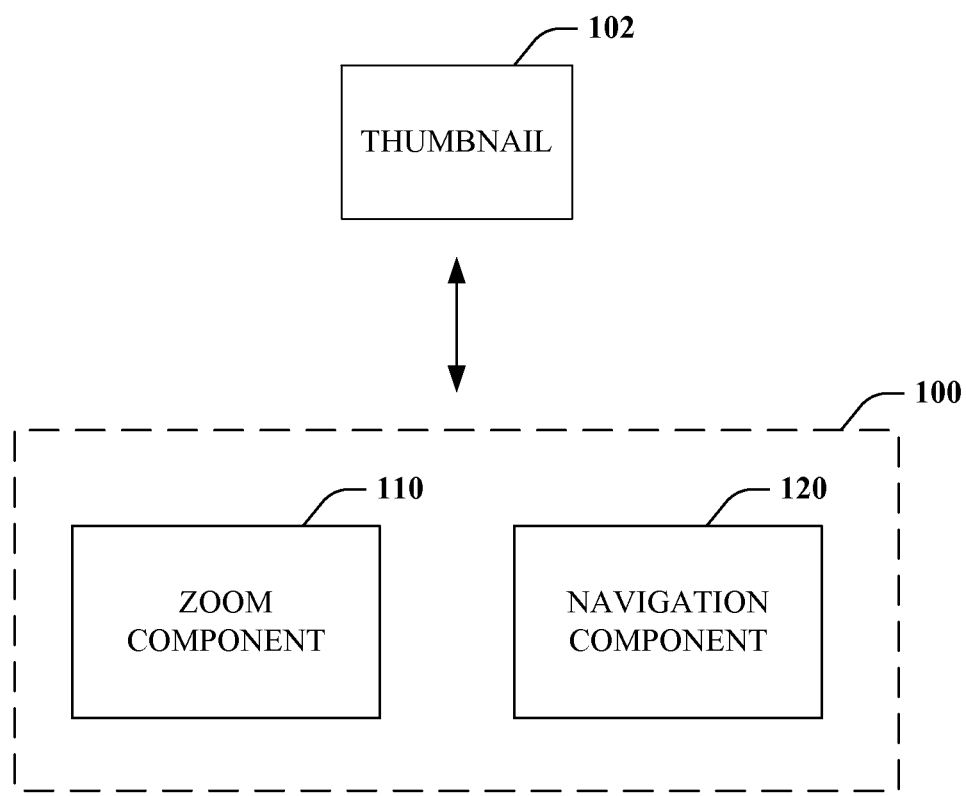
FIG. 1 is a block diagram of thumbnail interface system.

Referring initially to FIG. 1, a thumbnail interface system 100 is illustrated that facilitates file exploration. The system 100 includes zoom component 110 and a navigation component 120 to enable both zooming and navigation with respect to a thumbnail 102. Such actions can be in triggered in response to user interaction, or input, regarding the thumbnail 102, wherein the system 100 can support substantially any type of user input (e.g., speech, gaze . . . ) and manner of acquiring input (e.g., mouse, trackball, keyboard, touch screen, microphone, camera . . . ).

The thumbnail 102 is a visual representation of a file and as such can correspond to graphic object of a particular size. Typically, the graphic object is an image but not limited thereto, as it could also correspond to an animation or a video, among other things. For purposes of clarity, and not limitation, detailed description of disclosed aspects is described with respect to an image or simply a thumbnail.

The zoom component 110 is configured to produce a scaled image (e.g., magnified) that can replace a previous image, such as an un-scaled, default image, in response to a trigger, such as a hovering pointer. Furthermore, the scaled image can be of the same size as the un-scaled image. Stated differently, a thumbnail can be replaced with a scaled version of the thumbnail of same size. In accordance with one embodiment, the zoom component 110 can scale a thumbnail in accordance with a predefined path, for instance toward a predetermined focal point.

The navigation component 120 is configured to receive position data as a result of interaction with the thumbnail and produce a scaled graphic object as function of the position data, which can subsequently be presented to a user. In accordance with one aspect, position data can be utilized to guide zooming, rather than a more simplistic approach of presenting a set of one or more predetermined scaled graphic objects, for instance. By way of example, and not limitation, the zoom component 110 can produce an enlarged version of thumbnail based the position of a pointer or cursor within the thumbnail. Accordingly, if a pointer is located in the top left corner of the thumbnail, the top left portion of the thumbnail can be enlarged.

In accordance with another aspect, the position data can be utilized to navigate a scaled thumbnail, or in other words perform panning For example, position data can indicate a desire to view what is to the right of a current enlarged image, and as such, a new image representative of that position can be produced. Furthermore, it should be appreciated the position data can represent not only direction (e.g., left, right, up, down) but also magnitude of direction. In this manner, the data can specify whether to pan slightly to the right or to the right-most boundary, for instance. Such position data can correspond to movements and magnitudes of movements captured with respect to a scaled version of a thumbnail acquired for instance by way of a finger swipe or movement of a pointer in a particular direction.

Turning attention to FIGS. 2A-D, a number of thumbnails are shown that illustrate the result of zooming and navigation to facilitate clarity and understanding regarding aspects of the subject disclosure. These thumbnails are solely examples, however, and are not meant to limit the scope of the claimed subject matter.

Figure 2A:
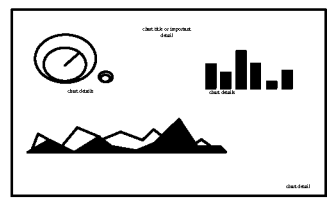
FIGS. 2A-D illustrate exemplary results of zooming and navigating with respect to a thumbnail.

FIG. 2A illustrates a default thumbnail corresponding to a complex report file with a number of charts and graphs, among other things. Opening such a report can involve an investment of time by a user and resources to view the contents of the report, so the default thumbnail provides a type preview of a file, or more specifically, file content. However, due to the diminutive nature of the thumbnail little more can be gleaned from this thumbnail other than that fact that the file is a report. Further, amongst other similar reports this thumbnail may not provide sufficient information to enable file content to be distinguished from other file content.

Figure 2B:
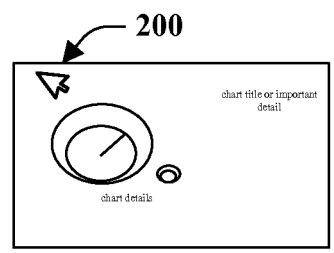

FIG. 2B illustrates a scaled thumbnail of the same size as the default thumbnail of FIG. 2A. The scaled thumbnail of FIG. 2B results upon positioning of pointer 200, for example utilizing a mouse, over the default thumbnail of FIG. 2A. More specifically, since the pointer is located in the top left corner, the top-left corner of the default thumbnail is magnified allowing a user to view further detail.

Figure 2C:
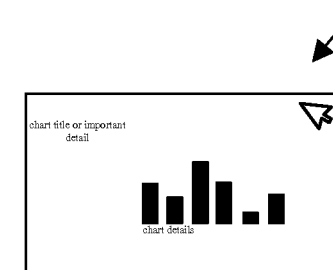

FIG. 2C depicts another scaled thumbnail, which is the result of movement of the pointer 200 from the top left corner to the top right corner with respect to the scaled thumbnail as provided in FIG. 2B. Alternatively, the same scaled thumbnail can be produced as a result of a targeted zoom, if the pointer was originally positioned at the top right as opposed to the top left with respect to the default thumbnail of FIG. 2A.

Figure 2D:
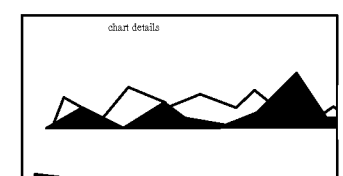

FIG. 2D shows yet another scaled thumbnail. Here, the scaled thumbnail can be produced as a result of moving the pointer down from the position provided in FIG. 2B or down and to the left from the position illustrated in FIG. 2C. Otherwise, the scaled thumbnail of FIG. 2D can be produced as a result of a targeted zoom by originally positioning the pointer 200 in the bottom left corner of the default thumbnail of FIG. 2A.

Returning to FIG. 1, the zoom component 110 and navigation component 120 can operate with respect to multiple levels of zoom rather than a single level of zoom as provided in FIGS. 2A-D. In other words, thumbnails can be produced across several levels of granularity. As a result, the zoom component 110 can be configured to incrementally scale a thumbnail to allow drill down to further detail or vice versa. Further, zoom can be directional based on an identified point of interest. By way of example, and not limitation, zooming can follow a user's mouse path to allow the user to better understand file content and facilitate file exploration.

In accordance with one aspect, a user can explicitly specify a zoom, for instance, by using a mouse scroll wheel to zoom in and out. Alternatively, the zoom can be performed automatically. In accordance with one embodiment, automatic zoom can be performed as a function of time, such as the time over which a pointer hovers over a particular area, for instance. Furthermore, the automatic zoom can seek to imitate a user comprehension pattern and generally achieve a pleasant effect. In furtherance thereof, zoom can be performed at different rates. For example, if a default thumbnail displays 100% of an image and a user can only read something at 50%, the automatic zoom can performed fast from 100% to 50% but slower from 50% to 10%. By scaling from 100% to 50% relatively fast, the scope is still large enough to provide a fair amount of context. As the thumbnail is continually magnified, the scaling rate can be slower to allow a user to read content and enable accurate movement/navigation since navigation becomes increasing sensitive with magnification. Further, the scaling rate can decrease as a function of scale such that zoom is performed continuously slower. Still further yet, a user can explicitly pause and restart automatic zoom to allow further time to analyze content, for example by pressing a key on a keyboard or clicking an otherwise unassigned mouse button.

Figure 3:
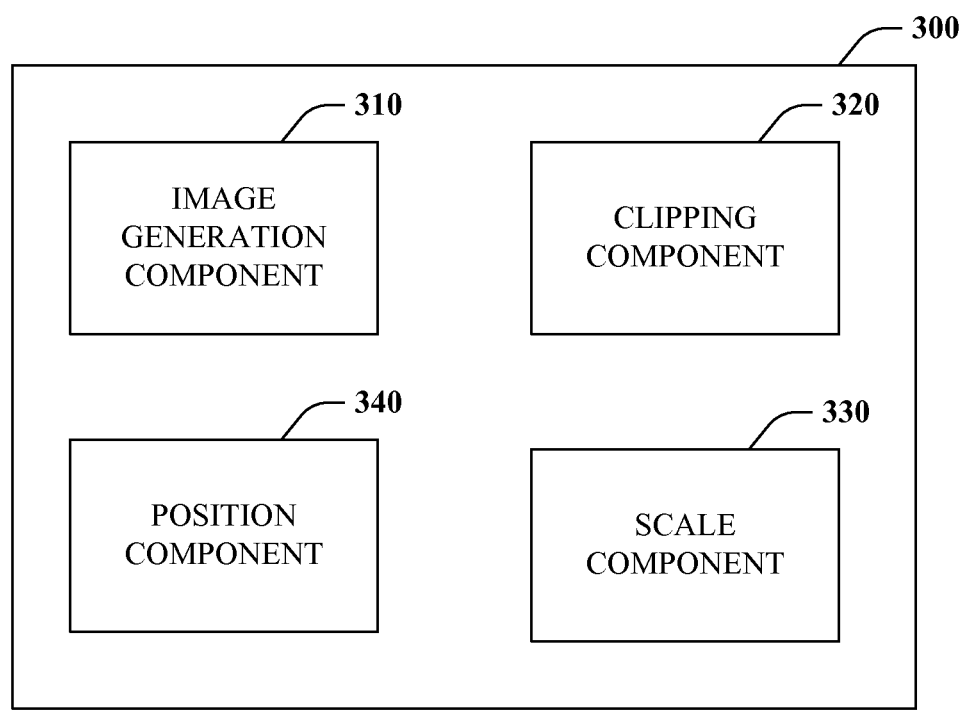
FIG. 3 is a block diagram of one particular implementation of the thumbnail interface system.

FIG. 3 depicts a thumbnail interface system 300 in accordance with one particular implementation that combines zoom and navigation functionality described with respect to zoom component 110 and navigation component 120 of system 100 of FIG. 1. Of course, this is solely one particular implementation. Other implementations are possible and will be apparent those of skill in the art upon reading this detailed description. As shown, system 300 includes image generation component 310, clipping component 320, scale component 330, and position component 340.

The image generation component 310 generates or otherwise acquires an image that represents file content. Generally, the image can be of larger size than a conventional thumbnail. In accordance with one embodiment, the image generation component 310 can be configured to open a file and capture a screen shot of the opened file periodically (e.g., daily, weekly, monthly . . . ) or upon change. Of course, various other mechanisms can be utilized to achieve the same result. For example, a program can maintain and make such an image available to the image generation component 310. Alternatively, the default thumbnail can be employed, if it is of a sufficiently high resolution to enable scaling.

The clipping component 320 is configured to generate a clipping mask (a.k.a. clipping window) of the same size as a thumbnail. Any portion inside the clipping mask is maintained while any portion outside the clipping mask is removed, or in other words clipped. Any conventional or novel clipping algorithm can be employed by the clipping component 320 for this purpose. As will be described further below, the generated clipping mask can be employed over the image provided, or made available, by the image generation component 310 to produce one or more images that can replace a default thumbnail.

The scale component 330 is configured to alter the size, or scale, of the image provided, or made available, by the image generation component 310. The scale component 330 thus enables zooming with respect to the clipping mask. As the size of the image increases with respect to a fixed-size clipping mask, zoom-in functionality results. By contrast, as the image size decreases with respect to a fixed-size clipping mask, the result is zoom-out functionality. Conceptually, this can be thought of as moving an image closer behind the clipping mask (zoom in) or moving the image farther away behind the clipping mask (zoom out).

The position component 340 is configured to position the generated image behind the clipping mask to enable image panning (e.g., up, down, right, left). Since the image is being moved rather than the clipping mask, movements are opposite a specified direction with respect to a thumbnail. For example, to pan right, the image is moved left, and to pan down the image is moved up. In sum, a large image can be positioned with respect to a small window.

While use of clipping masks is well known, the manner of use here is not. Conventionally, clipping masks are changed while an image remains static. Here, the clipping mask is static and the image changes. More specifically, a clipping mask size is typically modified to effect scaling and positioned at a particular location over an image. By contrast, the system 100 scales the image and positions the image relative to the fixed-size clipping mask.

Figure 4A:
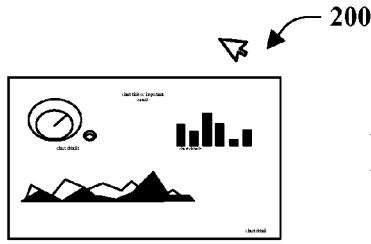
FIGS. 4A-D are illustrations of exemplary zoom and navigation functionality.
Figure 4B:
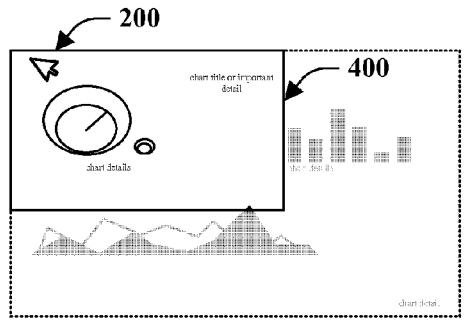
Figure 4C:
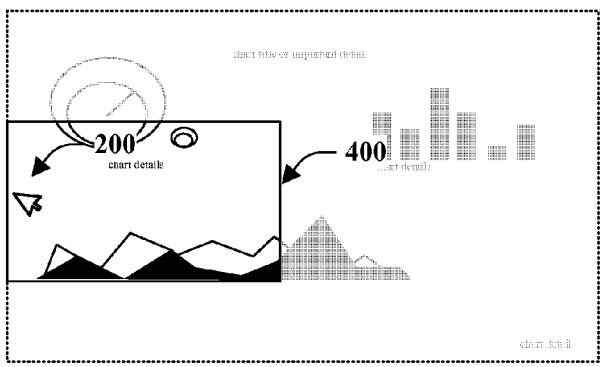
Figure 4D:
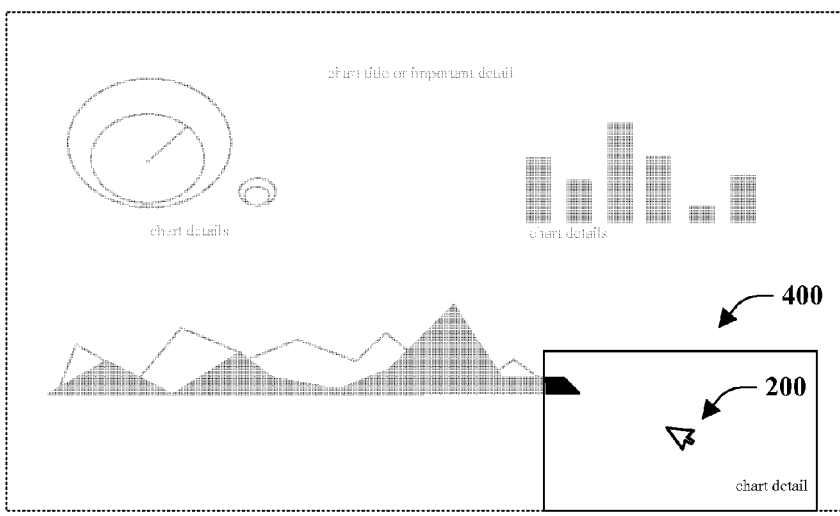

FIGS. 4A-D illustrate exemplary behavior of the thumbnail interface system 300 described with respect to FIG. 3. FIG. 4A illustrates a default thumbnail where the pointer 200 is not hovering over the thumbnail. When the pointer 200 is positioned over the thumbnail, as depicted in FIG. 4B, the thumbnail of FIG. 4A is replaced by a clipping mask 400 over a thumbnail image enlarged by a scaling factor "S" and positioned inversely to the pointer location over the clipping mask configured to match the size of the default thumbnail. In accordance with one aspect, after a period of time "t," the image is again automatically enlarged by a scaling factor "S" and repositioned inversely to the pointer location over the clipping mask 400 adjusted for the size of the image as shown in FIG. 4C. Once the thumbnail image is scaled to a predetermined maximum ratio, scaling stops but the image can be repositioned after each "t" amount of time as illustrated by FIG. 4D.

In accordance with one implementation, the following algorithm can be utilized to compute the scale and position of an image behind the clipping mask. Here, the tuple "Xp,Yp" is the current position of the pointer, "t" number of "ticks" (measurement of time) the pointer has been hovering over the thumbnail, "S" is the scaling factor (e.g., amount of zoom each tick), "Iw" and "Ih" are the original un-scaled image width and height, "Sw" and "Sh" are the scaled image width and height, and "Tw" and "Th" are the thumbnail width and height. The scaled image dimensions can be computed as:

Sw=lessor of (Tw*$S*t$) or (Iw)

Sh=lessor of (Th*$S*t$) or (Ih)

The image location can be computed as:

Image leftmost location $(x)=-(Xp/Tw)*Sw+Sw/2$

Image topmost location $(y)=-(Yp/Th)*Sh+Sh/2$

The speed of the zoom can be controlled by increasing or decreasing the amount of time for each tick "t." The smoothness of the zoom can be controlled by increasing or decreasing the scaling factor "S." The direction of the zoom (from zoom-in to zoom-out) can be controlled by changing the scaling factor to reduce the size of "Sw" and "Sh" up to a minimum size "Tw, Th." A zoom-out implementation can prioritize "(x, y)" to begin so that an "important" element of the file (a.k.a. focal point) was in the visual field of the thumbnail. This can be achieved by providing prioritized initial "(x,y)" coordinates for the thumbnail.

Figure 5:
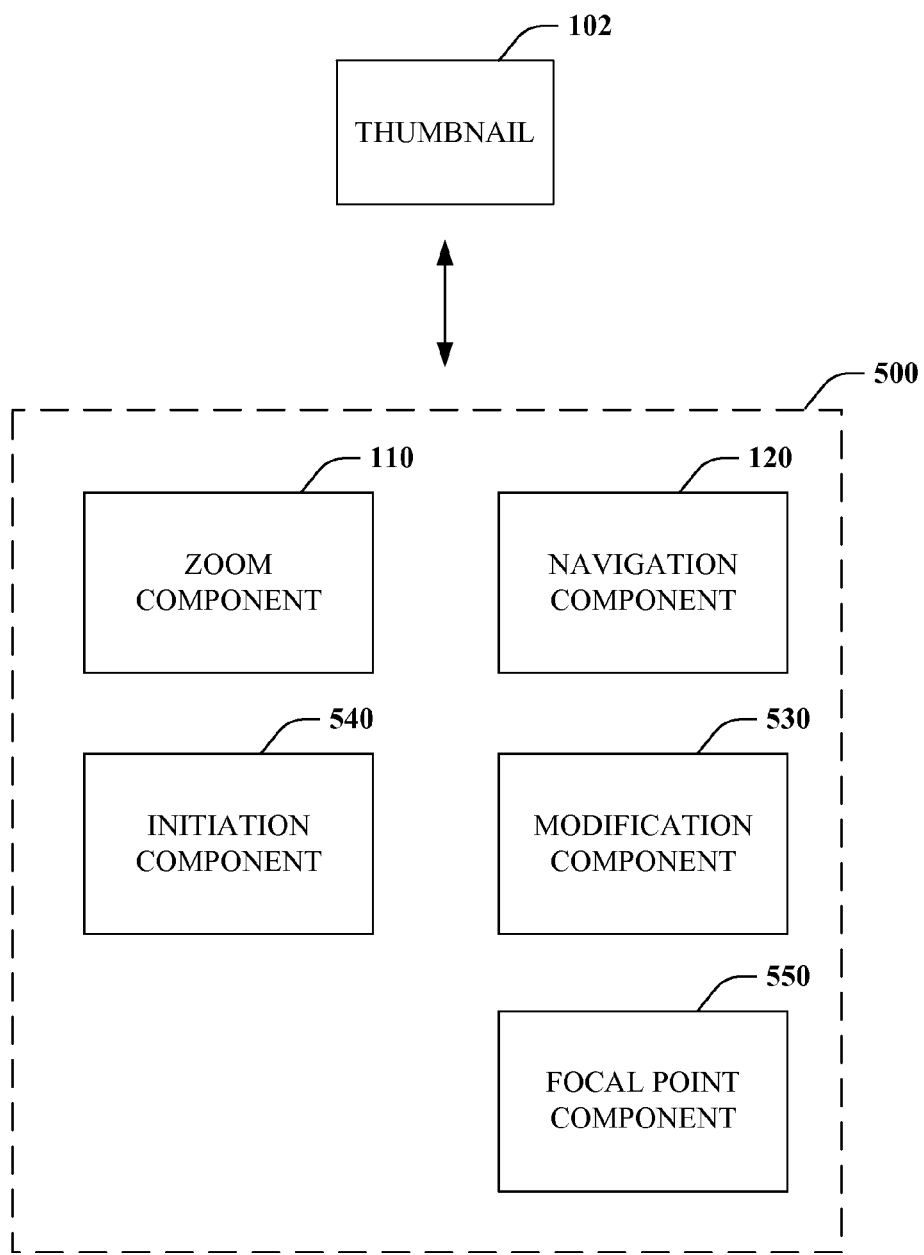
FIG. 5 is a block diagram of an extended thumbnail-interface system.

Turning attention to FIG. 5, the thumbnail interface system 500 is illustrated with extended functionality. As previously described with respect to system 100 of FIG.1, system 500 includes the zoom component 110 and the navigation component 120 to enable interaction with respect to the thumbnail 102. Additionally, the thumbnail interface system 100 includes modification component 530, initiation component 540, and focal point component 550. The modification component 530 is configured to accepted alterations with respect to a thumbnail that are then made in the file corresponding to the thumbnail. For example, the modification component 530 can allow a portion of the thumbnail to be highlighted. Subsequently, changes can be initiated to the file represented by the thumbnail to include the highlighted portion. Similarly, text or numbers can be entered with respect to the thumbnail, which can then initiate changes to the underlying file represented by the thumbnail. Although not limited thereto, the modification component 530 can be configured to record modifications with respect to a scaled thumbnail, identify the modifications, and cause the identified modifications to be made to the file.

Initiation component 540 can be configured to alter the manner in which a file is opened as a function of thumbnail interaction. By way of example, and not limitation, information regarding the thumbnail image presented at the time a file is to be opened can be passed to an associated program opening the file to allow the program to open the file with the same or similar view as provided by the thumbnail. In other words, if a user zooms in on a point of interest by way of a thumbnail, the same view can be presented to the user upon opening the file (e.g., double click on thumbnail).

Focal point component 550 can be configured to affect, or influence, thumbnail zooming and navigation based on a pre-determined focal point of a thumbnail. For example, a force function can be applied to pull image positioning toward the focal point. In this manner, the focal point provides a sort of gravitational pull to any identified point of interest. A myriad of techniques can be employed by which the focal point component 550 can determine the focal point ranging from quite simplistic to very complex. For example, for images the focal point can be the center of a person's face. In this case, as incremental zooming is performed, the zoom can be pulled toward the center of the person's face. In another instance, statistical analysis can be performed based on historical positioning information of a particular user or group of users. In this scenario, a sort of zoom-as-you-have-zoomed-before or zoom-as-others-have-zoomed functionality can be provided.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, various portions of the disclosed systems above and methods below can include or employ of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the focal point component 550 can employ such mechanisms to identify a focal point toward which zooming and/or navigation can be biased.

Figure 6:
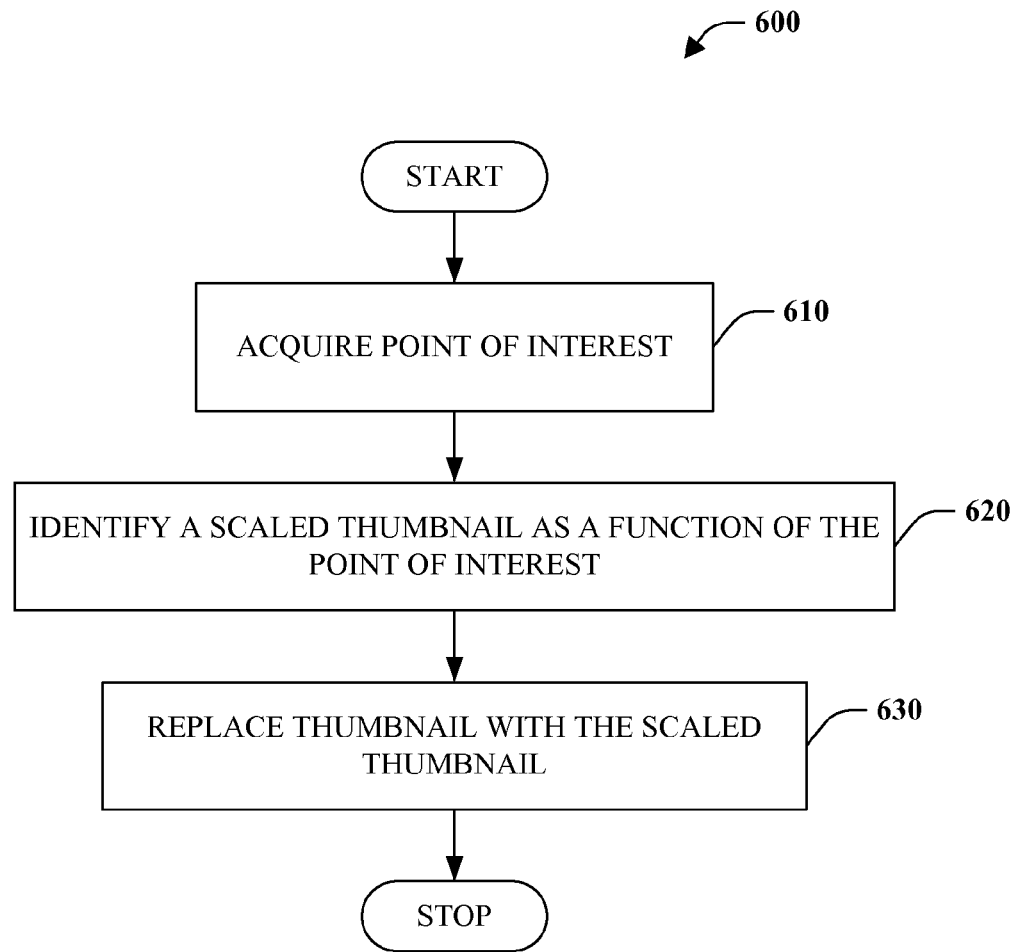
FIG. 6 is a flow chart diagram of a method of facilitating file exploration.
Figure 7:
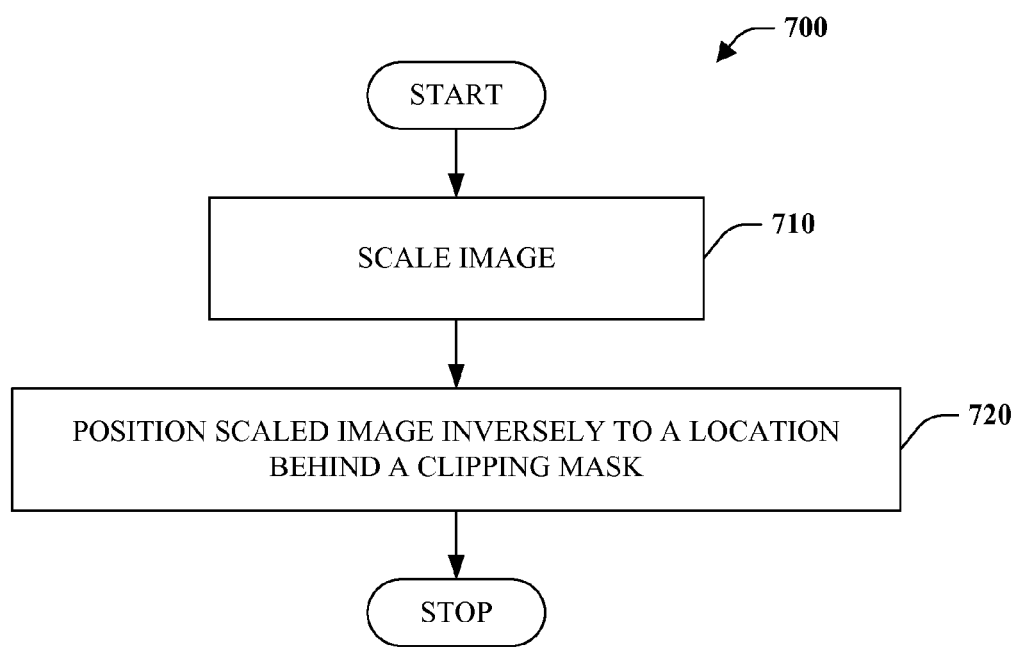
FIG. 7 is a flow chart diagram of a method of thumbnail zooming.
Figure 8:
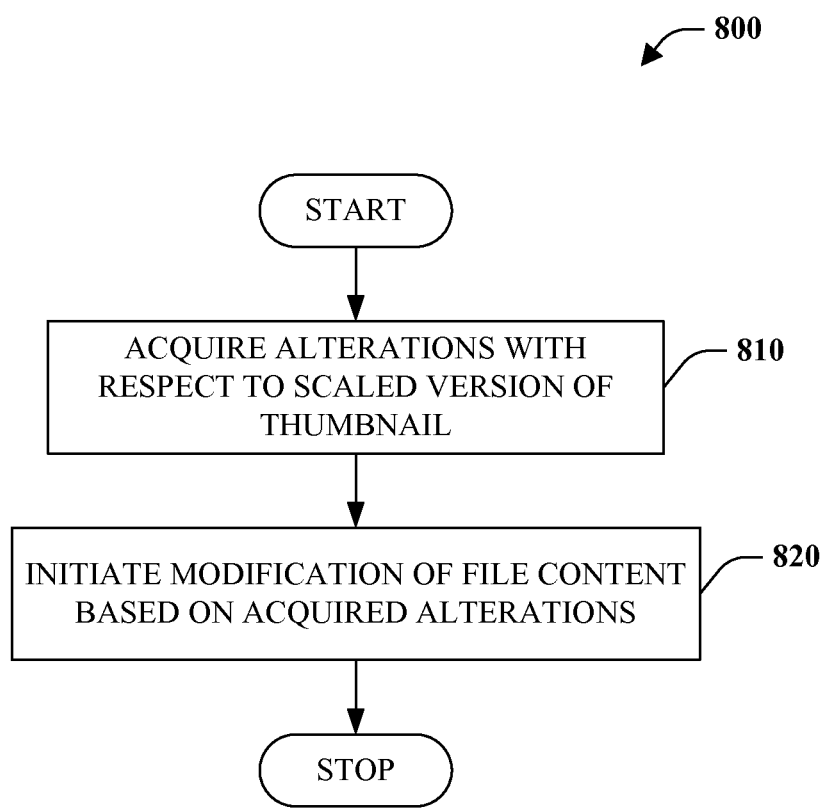
FIG. 8 is a flow chart diagram of a method of data modification.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 6, a method 600 of facilitating file exploration is illustrated. At reference numeral 610, receive point of interest, for example from a pointer positioned above a thumbnail. At numeral 620, a scaled thumbnail is identified as a function of the point of interest, wherein the scaled thumbnail is of the same size of a thumbnail. In other words, the scaled version of the thumbnail occupies the same display space as an original un-scaled thumbnail. Further, the scaled version can provide a different view with an unchanged scale. Stated differently, an additional scale factor need not be applied but rather a different panned view can be identified from a scaled thumbnail. The scale employed can vary in accordance with one or more factors. For example, scaling can be performed automatically as a function of time for instance (e.g., incremental scaling, predetermined time intervals) and/or upon explicit user instruction (e.g., via use of mouse wheel). Furthermore, scaling can involve one or both of zooming in and zooming out. At reference numeral 630, the thumbnail is replaced by the scaled thumbnail. Consequently, details are revealed by the scaled thumbnail regarding a corresponding file.

FIG. 7 depicts a method 700 of thumbnail zooming in accordance with one implementation. At reference numeral 710, an image, or other graphic object, is scaled either up or down to make the image larger or smaller, respectively. At numeral 720, the scaled image is positioned behind a clipping mask inversely to a given location. Among other things, the given location can be a user specified point of interested, a predetermined focal point, or a hybrid, wherein a user specified point of interest is altered, or biased, toward the focal point, for example. The clipping mask can be of fixed size corresponding to a particular thumbnail.

FIG. 8 is a flow chart diagram of a method 800 of data modification. At reference numeral 810, an alteration is acquired with respect to a scaled version of a thumbnail. The alteration can correspond to adding, updating, or deleting data, among other things. At numeral 820, modification of file content is initiated based on acquired alterations. By way of example, suppose a thumbnail represents a spreadsheet file of numerous cells (e.g., hundreds, thousands . . . ) corresponding to the intersection of rows and columns. A user can position a pointer over a thumbnail and in response be provided with magnified version of the spreadsheet focused on a few cells (e.g., two, three . . . ). Subsequently, a user can, by way of the thumbnail, click and alter the data in a cell of the spreadsheet without opening the spreadsheet, and the change can be made in the underlying spreadsheet file.

As used herein, the terms "component" and "system" as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

The conjunction "or" as used this description and appended claims in is intended to mean an inclusive "or" rather than an exclusive "or," unless otherwise specified or clear from context. In other words, "'X' or 'Y'" is intended to mean any inclusive permutations of "X" and "Y." For example, if "'A' employs 'X,'" "'A employs 'Y,'" or "'A' employs both 'A' and 'B,'" then "'A' employs 'X' or 'Y'" is satisfied under any of the foregoing instances.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 9:
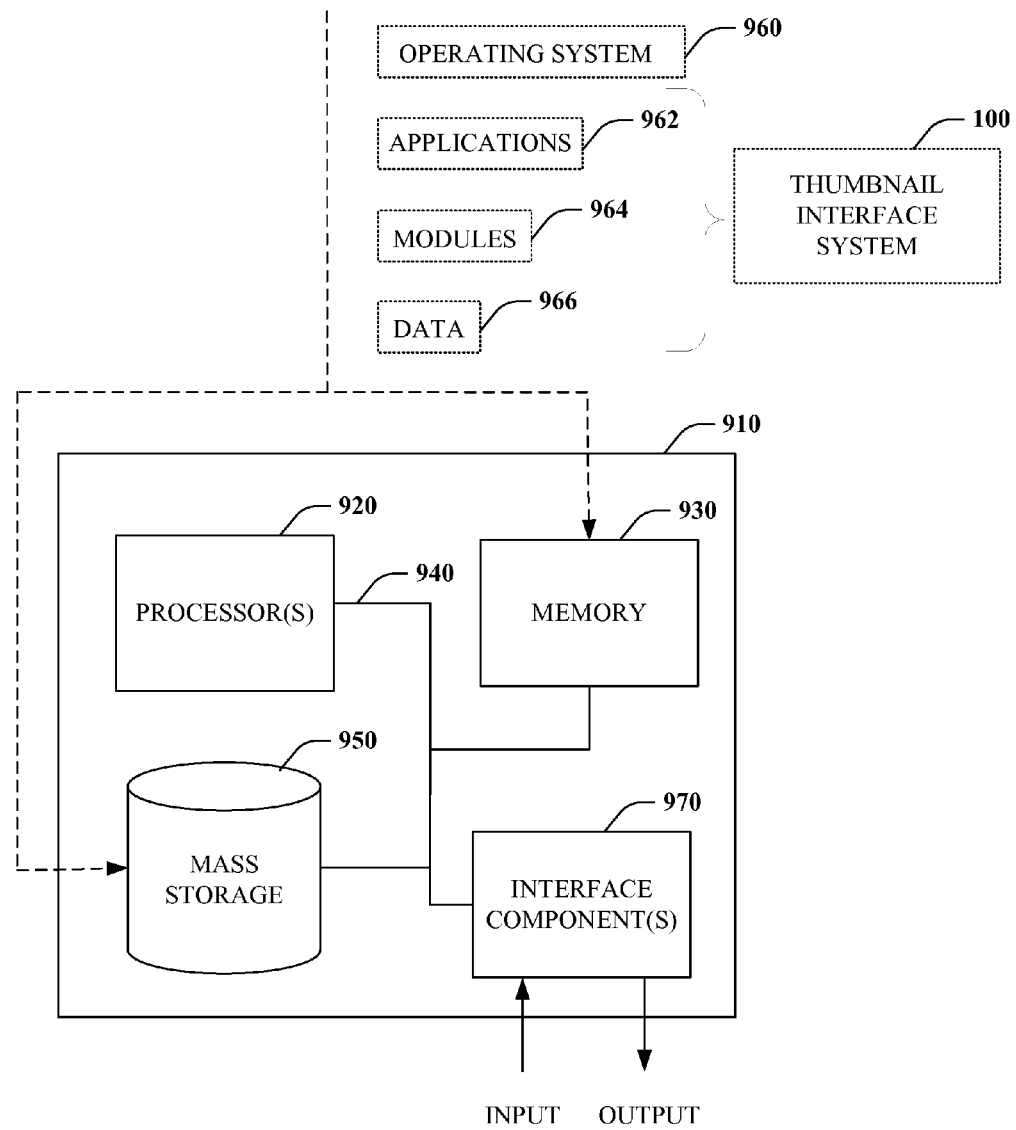
FIG. 9 is a schematic block diagram illustrating a suitable operating environment for aspects of the subject disclosure.

In order to provide a context for the claimed subject matter, FIG. 9 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 9, illustrated is an example general-purpose computer 910 or computing device (e.g., desktop, laptop, server, hand-held, programmable consumer or industrial electronics, set-top box, game system . . . ). The computer 910 includes one or more processor(s) 920, memory 930, system bus 940, mass storage 950, and one or more interface components 970. The system bus 940 communicatively couples at least the above system components. However, it is to be appreciated that in its simplest form the computer 910 can include one or more processors 920 coupled to memory 930 that execute various computer executable actions, instructions, and or components stored in memory 930.

The processor(s) 920 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 920 may also be implemented as a combination of computing devices, for example a combination of a DSP and a microprocessor, a plurality of microprocessors, multi-core processors, one or more microprocessors in conjunction with a DSP core, or any other such configuration.

The computer 910 can include or otherwise interact with a variety of computer-readable media to facilitate control of the computer 910 to implement one or more aspects of the claimed subject matter. The computer-readable media can be any available media that can be accessed by the computer 910 and includes volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 910.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 930 and mass storage 950 are examples of computer-readable storage media. Depending on the exact configuration and type of computing device, memory 930 may be volatile (e.g., RAM), non-volatile (e.g., ROM, flash memory . . . ) or some combination of the two. By way of example, the basic input/output system (BIOS), including basic routines to transfer information between elements within the computer 910, such as during start-up, can be stored in nonvolatile memory, while volatile memory can act as external cache memory to facilitate processing by the processor(s) 920, among other things.

Mass storage 950 includes removable/non-removable, volatile/non-volatile computer storage media for storage of large amounts of data relative to the memory 930. For example, mass storage 950 includes, but is not limited to, one or more devices such as a magnetic or optical disk drive, floppy disk drive, flash memory, solid-state drive, or memory stick.

Memory 930 and mass storage 950 can include, or have stored therein, operating system 960, one or more applications 962, one or more program modules 964, and data 966. The operating system 960 acts to control and allocate resources of the computer 910. Applications 962 include one or both of system and application software and can exploit management of resources by the operating system 960 through program modules 964 and data 966 stored in memory 930 and/or mass storage 950 to perform one or more actions. Accordingly, applications 962 can turn a general-purpose computer 910 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the thumbnail interface system 100, or portions thereof, can be, or form part, of an application 962, and include one or more modules 964 and data 966 stored in memory and/or mass storage 950 whose functionality can be realized when executed by one or more processor(s) 920.

In accordance with one particular embodiment, the processor(s) 920 can correspond to a system on a chip (SOC) or like architecture including, or in other words integrating, both hardware and software on a single integrated circuit substrate. Here, the processor(s) 920 can include one or more processors as well as memory at least similar to processor(s) 920 and memory 930, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the thumbnail interface system 100 and/or associated functionality can be embedded within hardware in a SOC architecture.

The computer 910 also includes one or more interface components 970 that are communicatively coupled to the system bus 940 and facilitate interaction with the computer 910. By way of example, the interface component 970 can be a port (e.g., serial, parallel, PCMCIA, USB, FireWire . . . ) or an interface card (e.g., sound, video . . . ) or the like. In one example implementation, the interface component 970 can be embodied as a user input/output interface to enable a user to enter commands and information into the computer 910 through one or more input devices (e.g., pointing device such as a mouse, trackball, stylus, touch pad, keyboard, microphone, joystick, game pad, satellite dish, scanner, camera, other computer . . . ). In another example implementation, the interface component 970 can be embodied as an output peripheral interface to supply output to displays (e.g., CRT, LCD, plasma . . . ), speakers, printers, and/or other computers, among other things. Still further yet, the interface component 970 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating file exploration, comprising: employing at least one processor configured to execute computer-executable instructions stored in memory to perform the following acts:
   receiving user input specifying a point of interest within a thumbnail caused to be displayed on a display device;
   automatically determining a focal point within the thumbnail based on thumbnail content, wherein the focal point, corresponding to an object within the thumbnail content, is offset from the center of the thumbnail by a distance greater than zero;
   generating an adjusted point of interest using a location of the focal point to shift the point of interest toward the focal point, wherein the point of interest and the focal point are different in location;
   identifying a scaled thumbnail of same size as the thumbnail based on the adjusted point of interest; and
   replacing the thumbnail with the scaled thumbnail for display on the display device.

2. The method of claim 1, identifying the scaled thumbnail with a different view and unchanged scale.

3. The method of claim 1 comprises determining the focal point based on historically specified points of interest.

4. The method of claim 1 further comprises acquiring an alteration of content of a file represented by the thumbnail with respect to the scaled thumbnail.

5. The method of claim 1 further comprises notifying a program to open a file associated with the thumbnail in a view corresponding to the scaled thumbnail.

6. The method of claim 1 further comprises replacing the scaled thumbnail with the thumbnail.

7. The method of claim 1, determining the focal point comprises recognizing a face and identifying the center of the face.

8. A system comprising:
   a processor coupled to a memory, the processor configured to execute machine-executable instructions stored in the memory that when executed perform acts comprising:
   receiving a point of interest specified within a thumbnail caused to be displayed on a display device;
   automatically determining a focal point within the thumbnail based on thumbnail content, wherein the focal point, corresponding to an object within the thumbnail content, is offset from the center of the thumbnail by a distance greater than zero; and
   identifying a scaled thumbnail of same size as the thumbnail based on an adjusted point of interest, wherein the adjusted point of interest is generated using a location of the focal point to shift the point of interest toward the focal point, wherein the point of interest and focal point are different in location; and
   causing the thumbnail to be replaced with the scaled thumbnail on the display device.

9. The system of claim 8, the acts further comprises initiating loading of a file associated with the scaled thumbnail with a view that matches the scaled thumbnail.

10. The system of claim 8, the acts further comprise accepting a change with respect to underlying content represented by the thumbnail.

11. The system of claim 8, the acts further comprise determining the focal point based on historically specified points of interest.

12. The system of claim 11, the acts further comprise replacing the scaled thumbnail with the thumbnail.

13. The system of claim 8, the focal point is determined by recognition of a face and identification of the center of the face.

14. A computer-readable storage device having instructions stored thereon that enable at least one processor to perform a method upon execution of the instructions, the method comprising:

receiving user input specifying a point of interest within a thumbnail caused to be displayed on a display device;

automatically determining a focal point within the thumbnail based on thumbnail content, wherein the focal point, corresponding to an object within the thumbnail content, is offset from the center of the thumbnail by a distance greater than zero;

generating an adjusted point of interest using a location of the focal point to shift the point of interest toward the focal point, wherein the point of interest and the focal point are different in location;

identifying a scaled thumbnail of same size as the thumbnail based on the adjusted point of interest; and replacing the thumbnail with the scaled thumbnail for display on the display device.

15. The computer-readable storage device of claim 14, the method further comprises identifying the scaled thumbnail with a different view and unchanged scale.

16. The computer-readable storage device of claim 14, the method further comprises determining the focal point based on historically specified points of interest.

17. The computer-readable storage device of claim 14, the method further comprises acquiring an alteration of content of a file represented by the thumbnail with respect to the scaled thumbnail.

18. The computer-readable storage device of claim 14, the method further comprises notifying a program to open a file associated with the thumbnail in a view corresponding to the scaled thumbnail.

19. The computer-readable storage device of claim 14, the method further comprises replacing the scaled thumbnail with the thumbnail.

* * * * *